No. 620,194.   
J. A. STEURER.  
GYNECOLOGICAL STIRRUP.  
(Application filed Oct. 26, 1897.)  
Patented Feb. 28, 1899.
(No Model.)
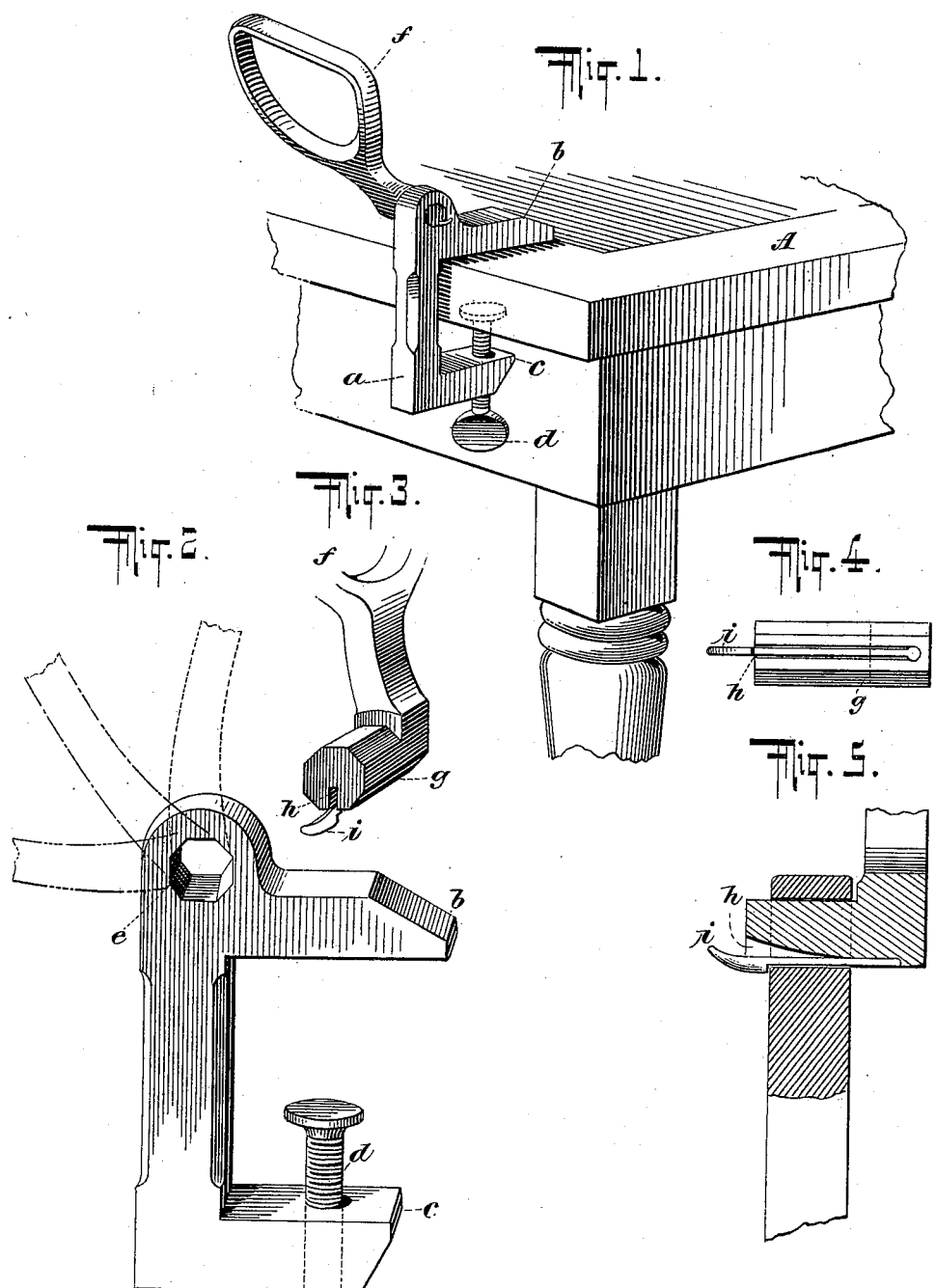
WITNESSES:
INVENTOR  
John A. Steurer.  
BY  
ATTORNEYS

UNITED STATES PATENT OFFICE.

JOHN A. STEURER, OF NEW YORK, N. Y.

GYNECOLOGICAL STIRRUP.

SPECIFICATION forming part of Letters Patent No. 620,194, dated February 28, 1899.

Application filed October 26, 1897. Serial No. 656,398. (No model.)

*To all whom it may concern:*

Be it known that I, JOHN A. STEURER, residing in the city of New York, in the county and State of New York, have invented an Improved Gynecological Stirrup, of which the following is a specification.

My invention relates to gynecological stirrups or foot-supports for use in performing surgical operations or conducting examinations.

To this end my invention consists in the construction hereinafter particularly pointed out and claimed.

My invention will be understood by referring to the accompanying drawings, in which—

Figure 1 is an isometric view of the corner of a table having a stirrup embodying my invention applied thereto. Fig. 2 is a side view of the bracket shown in Fig. 1. Fig. 3 is an isometric view of the end of the stirrup which enters the bracket. Fig. 4 is a bottom view of the end of the said stirrup, showing the securing spring-latch; and Fig. 5 is a sectional view of the upper part of the bracket and lower end of the stirrup, showing the stirrup in place in the bracket.

In the drawings, $a$ is a suitable bracket, which may be, as in the present instance, provided with arms $b$ $c$ for engaging the table A or a bed. One of the arms, as $c$, is shown as provided with a thumb-screw $d$. The bracket has an aperture $e$ in the form of a regular polygon. This opening is made to receive the shank $g$ or lower end of the stirrup $f$, which shank projects from the stirrup at right angles thereto and is in the form of a similar regular polygon, so as to prevent the said shank from rotating in the aperture. The shank may be adjusted in the aperture so as to support the stirrup at the desired inclination. (See Fig. 2.) This shank $g$ is shown as recessed at $h$ and provided with a spring-latch $i$. It will be understood that the shank $g$ is inserted into the aperture $e$, and the latch $i$, springing over the edge of the aperture, prevents the stirrup from being withdrawn from the bracket, except by lifting the latch manually and sliding the shank out of the aperture $e$. In use the shank receives a twisting strain.

It will be observed that the foot support or stirrup can be adjusted to the bracket and will be rigidly supported thereby, as it cannot revolve on its shank nor can the shank revolve in the aperture. It will likewise be observed that instead of putting the stirrup on the right side of the bracket it may be reversed and the shank entered from the left side of the bracket, or vice versa, so that the bracket may be employed on the horizontal edge of a table or the vertical edge of a bedstead or may be used where the edge is inclined, and, in fact, the adjustability of the structure enables it to be used in almost any situation.

What I claim, and desire to secure by Letters Patent, is—

In a gynecological stirrup, the combination of a bracket or support provided with an aperture in the form of a regular polygon, a stirrup or foot-rest provided with a shank projecting from the stirrup or foot-rest at right angles thereto, the said shank being in the form of a regular polygon of substantially the same size and shape as the polygonal recess and adapted to be received in said recess and when in place therein to be prevented from turning when receiving a twisting strain in use, and a spring-latch carried by the stirrup and engaging the bracket or support to prevent the withdrawal of the shank from the recess, whereby the stirrup may be securely supported in several different positions and readily changed from one position to another.

JOHN A. STEURER.

Witnesses:
 GEO. E. MORSE,
 CHARLES E. SMITH.